United States Patent
Boehm et al.

(10) Patent No.: US 12,307,120 B2
(45) Date of Patent: May 20, 2025

(54) INTER-DEVICE COMMUNICATIONS FOR MEMORY HEALTH MONITORING

(71) Applicant: Micron Technology, Inc., Boise, ID (US)

(72) Inventors: Aaron P. Boehm, Boise, ID (US); Mark D. Ingram, Boise, ID (US); Scott E. Schaefer, Boise, ID (US); Scott D. Van De Graaff, Boise, ID (US); Todd J. Plum, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 115 days.

(21) Appl. No.: 17/695,364

(22) Filed: Mar. 15, 2022

(65) Prior Publication Data

US 2022/0317916 A1    Oct. 6, 2022

Related U.S. Application Data

(60) Provisional application No. 63/170,850, filed on Apr. 5, 2021.

(51) Int. Cl.
*G06F 3/06*    (2006.01)

(52) U.S. Cl.
CPC .......... *G06F 3/0653* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,429,469 B2 * | 4/2013 | Korkishko | ............ | G06F 21/645 714/719 |
| 8,621,141 B2 * | 12/2013 | Mudama | ............ | G11C 16/3495 711/159 |
| 9,158,670 B1 * | 10/2015 | Kang | ............ | G06F 3/0652 |
| 9,390,000 B2 * | 7/2016 | Matsunaga | ............ | G06F 12/0246 |
| 11,216,365 B1 * | 1/2022 | Kuzmin | ............ | G06F 3/0688 |

(Continued)

OTHER PUBLICATIONS

European Patent Office, "European search report and Search Opinion", issued in connection with European Patent Application No. 22166570.6 dated Aug. 30, 2022 (9 pages).

*Primary Examiner* — Elias Mamo
(74) *Attorney, Agent, or Firm* — Holland & Hart LLP

(57) ABSTRACT

Methods, systems, and devices for inter-device communications for memory health monitoring are described. These communications relate to a host device that is associated with a memory device that monitors and reports health information (e.g., one or more parameters associated with a status of the memory device). The memory device may transmit the health information to the host device (e.g., a vehicle or a computer of the vehicle), which may perform one or more operations and transmit the health information to another entity of a system (e.g., ecosystem) including the host device. The host device may additionally or alternatively use the health information. In some cases, the other entity may receive the health information and transmit a signal back to the host device based on the health information. The other entity of the ecosystem may receive the health information and may make a determination based on the health information.

26 Claims, 8 Drawing Sheets

(56) References Cited

U.S. PATENT DOCUMENTS

| | | | |
|---|---|---|---|
| 2003/0083079 A1* | 5/2003 | Clark | G08G 1/096716 |
| | | | 455/466 |
| 2007/0180328 A1 | 8/2007 | Cornwell et al. | |
| 2007/0260811 A1* | 11/2007 | Merry | G11C 16/349 |
| | | | 711/103 |
| 2017/0315879 A1* | 11/2017 | Park | G06F 11/1469 |
| 2020/0293419 A1 | 9/2020 | Messick et al. | |

* cited by examiner

INTER-DEVICE COMMUNICATIONS FOR MEMORY HEALTH MONITORING

CROSS REFERENCE

The present application for patent claims priority to U.S. Provisional Patent Application No. 63/170,850 by Boehm et al., entitled "INTER-DEVICE COMMUNICATIONS FOR MEMORY HEALTH MONITORING", filed Apr. 5, 2021, which is assigned to the assignee hereof, and which is expressly incorporated by reference in its entirety herein.

FIELD OF TECHNOLOGY

The following relates generally to one or more systems for memory and more specifically to inter-device communications for memory health monitoring.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
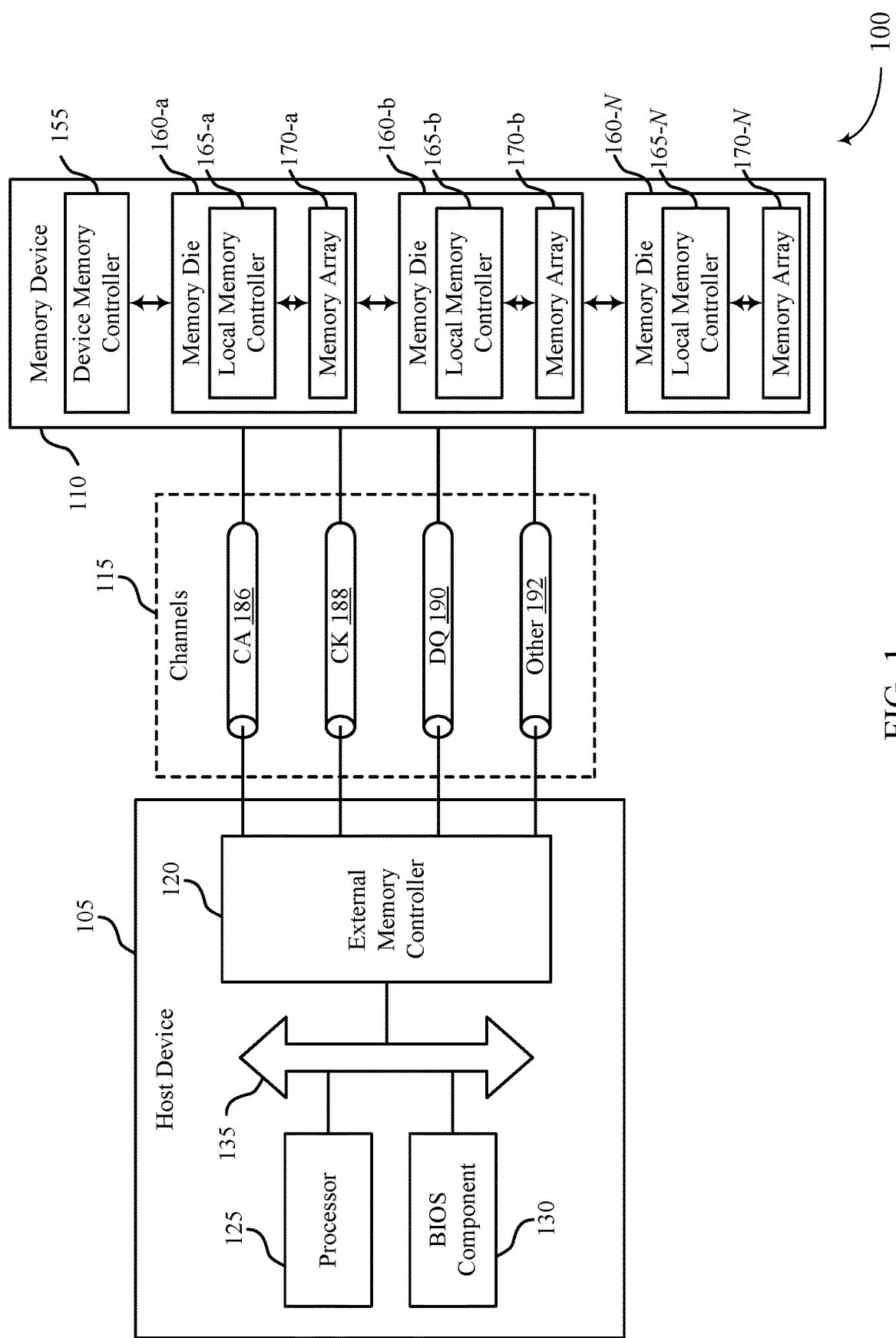
FIG. 1 illustrates an example of a system that supports inter-device communications for memory health monitoring in accordance with examples as disclosed herein.

A memory device (e.g., a memory subsystem) may be in communication with, be coupled with, or be included in a host device (e.g., a vehicle, computer, or cell phone). Usage and environmental conditions may vary between different categories of host devices, as well as between different host devices in a same category. As such, a usage level (e.g., level of wear), a remaining lifetime, or a general degradation of a memory device may be unknown to the memory device or the host device. In such cases, a memory device may begin to experience performance degradation or failure without the knowledge of the memory device or the host device, which may result in failure of the memory device or failure of one or more portions of a system including the memory device or the host device. A host device (e.g., a vehicle computer, a laptop) may be an part of a larger system. For example, a vehicle's system may include the vehicle, one or more other vehicles, a memory vendor, a system integrator, an automotive original equipment manufacturer (OEM), one or more fleet managers, or any other entity that may interact with the vehicle. Usage or wear parameters of the memory device may be unknown to such entities associated with the host device. As such, servicing and replacement schedules of the memory device or the host device, one or more manufacturing parameters of the memory device, or one or more manufacturing parameters of the host device, among other examples, may be based on inaccurate data.

The present disclosure provides techniques for a host device (e.g., a vehicle) to include or use a memory subsystem (e.g., a memory device) that monitors and reports health information (e.g., one or more parameters associated with a status of the memory device). The memory device may transmit the health information to a non-volatile storage space (e.g., may transmit the health information to the host device). The host device (e.g., a vehicle or a computer or system-on-a-chip (SoC) of the vehicle) may transmit the health information to another entity of the system, or may use the health information, or both. In some cases, the other entity of the system may receive the health information and transmit a signal back to the host device based on the health information (e.g., indicating one or more parameters for implementation at the host device, the memory device, or both). In some cases, the other entity of the system may receive the health information and may make a determination based on the health information. Receiving updated health information in real time from the memory device may support an increased accuracy for servicing and repair schedules, as well as increased accuracy for one or more manufacturing or design parameters of the memory device, or host device (e.g., the vehicle or associated computers), or both.

Features of the disclosure are initially described in the context of systems and dies as described with reference to FIGS. 1 and 2. Features of the disclosure are described in the context of a system and process flow as described with reference to FIGS. 3 and 4. These and other features of the disclosure are further illustrated by and described with reference to an apparatus diagram and flowcharts that relate to inter-device communications for memory health monitoring as described with reference to FIGS. 5-8.

FIG. 1 illustrates an example of a system 100 that supports inter-device communications for memory health monitoring in accordance with examples as disclosed herein. The system 100 (e.g., a memory subsystem) may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110). The memory subsystem or system 100 may, in some cases, be referred to as a memory device 110 or memory devices 110.

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105. As described herein, the host device 105 may receive information (e.g., health information, related to a status of a memory device 110) from a memory device 110. The host device 105 may make one or more determinations based on the information, or may forward the information to one or more other devices in a system that includes or is in communication with the host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include various peripheral components. The peripheral components may be any input device or output device, or a set of pins for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or bus with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dice 160 (e.g., memory chips) to support a desired capacity or a specified capacity for data storage. Each memory die 160 (e.g., memory die 160 a, memory die 160 b, memory die 160 N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dice 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dice 160, or the processor 125. In some examples, the device memory controller 155 may control operation of the memory device 110 described herein in conjunction with the local memory controller 165 of the memory die 160.

The memory device 110 may include (e.g., within dedicated circuitry or as a part of a controller, such as the local memory controller 165 or device memory controller 155) health monitoring circuitry. The memory device 110 may use the health monitoring circuitry to monitor and determine one or more parameters indicative of a status of the memory device, such as with relation to operation and access of memory cells within a memory array 170. The memory device may transmit the one or more parameters to the host device 105.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

In some cases, one or more channels 115 (e.g., a dedicated channel or a shared channel) may be used to communicate information, such as health monitoring information, from the memory device 110 to the host device 105. The channel(s) 115 may be associated with communication of data or control information, or may be dedicated to communicating health status information.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

Figure 2:
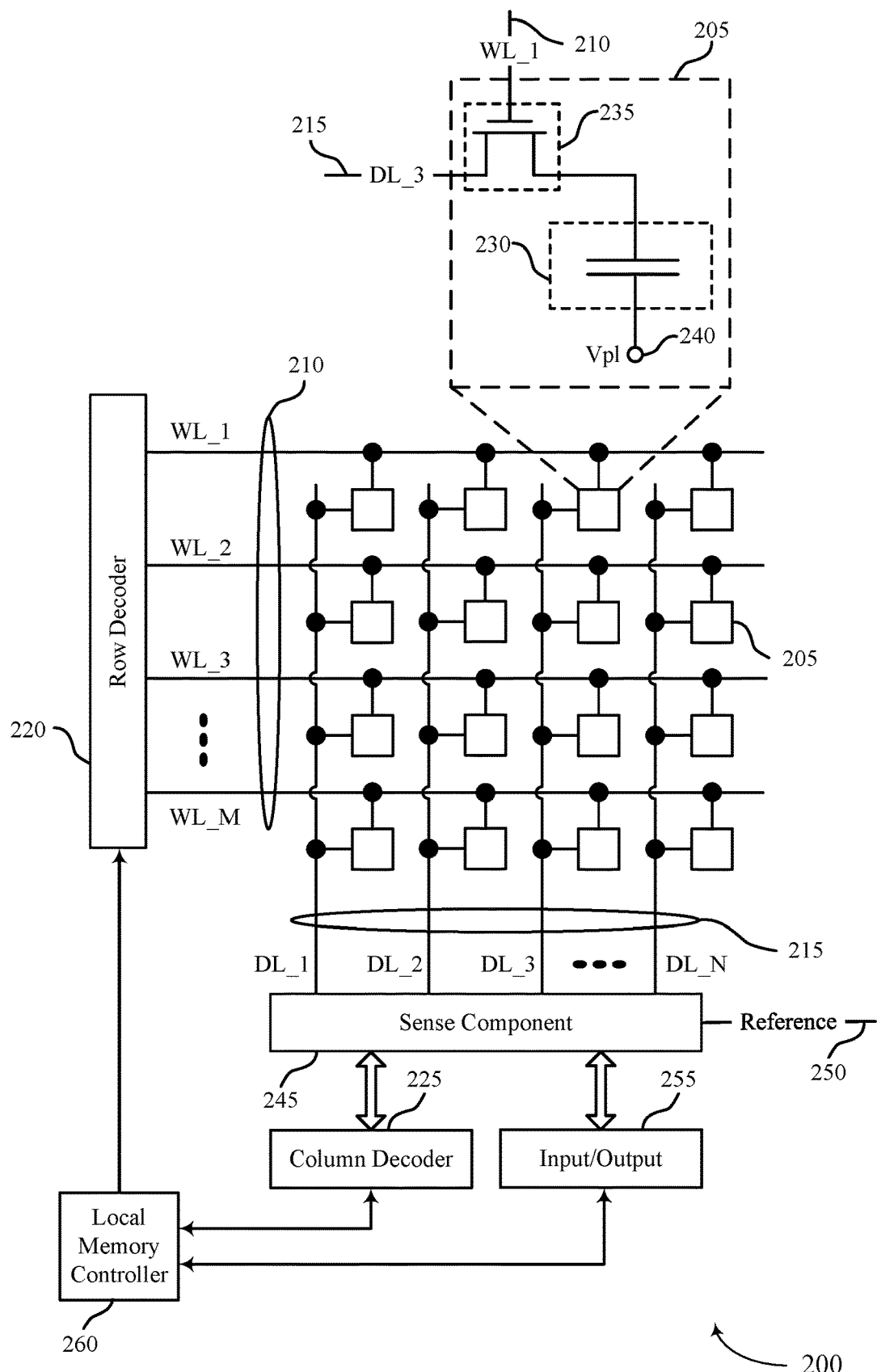
FIG. 2 illustrates an example of a memory die that supports inter-device communications for memory health monitoring in accordance with examples as disclosed herein.

FIG. 2 illustrates an example of a memory die 200 that supports inter-device communications for memory health monitoring in accordance with examples as disclosed herein. The memory die 200 may be an example of the memory dice 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

As describe herein, a memory device that includes the memory die 200 may transmit health information to a host device, and the host device may perform one or more operations (e.g., may determine one or more parameters for the memory device) and may, in some examples, transmit the health information to another entity of a system that includes the host device. In some cases, the other entity of the system may receive the health information and transmit a signal back to the host device based on the health information (e.g., indicating one or more parameters for implementation at the host device, or the memory device, or both). In some cases, the other entity of the system may receive the health information and may make a determination or decision based on the health information.

Figure 3:
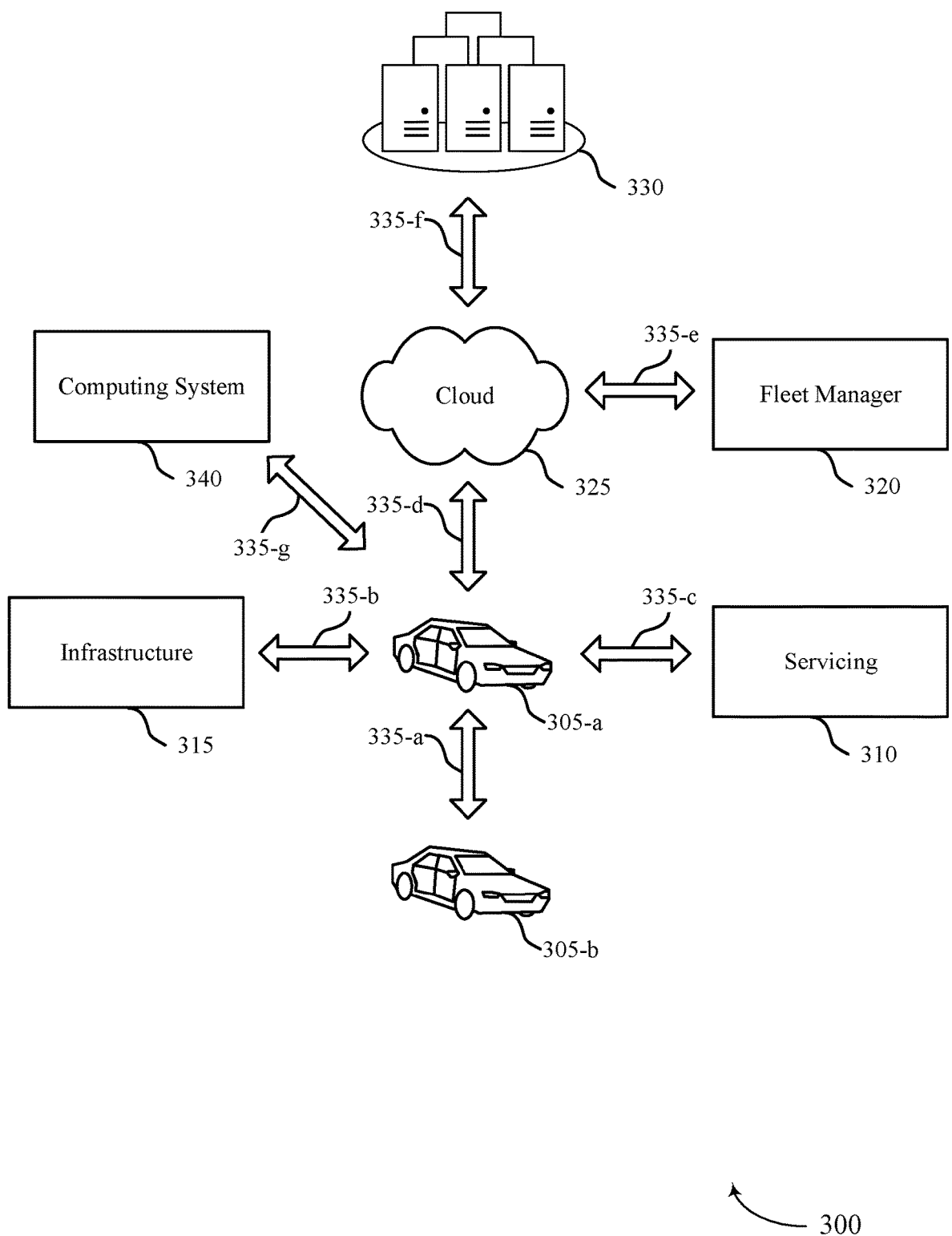
FIG. 3 illustrates an example of a system that supports inter-device communications for memory health monitoring in accordance with examples as disclosed herein.

FIG. 3 illustrates an example of a system 300 that supports inter-device communications for memory health monitoring in accordance with examples as disclosed herein. The system 300 may include a device, such as a vehicle 305-a, which may be an example of a host device 105 as described with reference to FIGS. 1 and 2 (e.g., the vehicle 305-a may include one or more computers or SoCs that may represent the host device 105). The host device 105 may include or be coupled with a memory device 110 as described with reference to FIGS. 1 and 2. In some cases, the system 300 may represent or be referred to as an ecosystem, which for example, may represent a model for utilizing outputs associated with health information monitoring at one or more devices, such as the memory device 110 (e.g., one or more parameters indicative of a status of the memory device 110). The health information (e.g., output by the memory device 110) may be used by different entities of the system 300 as described herein.

Although the system 300 is described herein with reference to a host device 105 associated with a vehicle 305, it is to be understood that the examples may also apply to other host devices 105 (e.g., to data center computers, secure laptops) without departing from the scope of the present disclosure. Similarly, the examples of the entities of the system 300 described herein may also apply to other entities associated with such host devices 105, or other entities associated with the host device of the vehicle 305, without departing from the scope of the present disclosure.

Usage and environmental conditions may vary between different categories of host devices 105, as well as between different host devices 105 in a same category. As such, a usage level (e.g., level of wear), a remaining lifetime, or a general degradation of the memory device 110 may be unknown to the memory device 110 or the host device 105. In such cases, the memory device 110 may begin to experience performance degradation or failure without the knowledge of the memory device 110 or the host device 105, which may result in failure of the memory device 110 or failure of one or more portions or entities of the system 300. Usage or wear parameters of the memory device may be unknown to such entities, which may be associated with the host device 105. As such, servicing and replacement schedules of the memory device 110 or host device 105, one or more manufacturing parameters or the memory device 110, or one or more manufacturing parameters of the host device 105, among other examples, may be based on inaccurate data.

The present disclosure related to the memory device 110 monitoring for indications of health problems (e.g., circuit degradation, compromised data integrity), for example, using one or more dedicated components, or circuitry, or both of the memory device 110. The memory device 110 may store the results of monitoring (e.g., health information, one or more parameters indicative of the status of the memory device 110) at the memory device 110, or may transmit the results to the host device 105. In some cases, the memory device 110 may store the health information at a register of the memory device 110 (e.g., an external register, a mode register), and the host device 105 may access the register and the associated health information. The host device 105 may use the health information, for example, to track or estimate a lifetime of the memory device 110 or to adjust one or more parameters (e.g., operational parameters) of the memory device 110, among other examples.

For example, the vehicle 305-a (e.g., the host device 105 or other component of the vehicle 305-a) may include subsystems such as usage loggers, degradation trackers, health status trackers, or remaining life trackers (e.g., among other examples), or any combination thereof that may use the health information from the memory device 110 to make decisions, track the health information, or generate one or more other health-related parameters. The vehicle 305-a may additionally or alternatively include hardware (e.g., processing elements, memory devices, sensors) that may use or interact with the health information or the generated health parameter(s). The vehicle 305-a may use the health information or the generated health parameter(s) to make safety-related decisions for hardware (e.g., mission-critical or safety hardware). For example, the vehicle 305-a may issue a warning for risk of failure to a driver, based on life degradation as indicated by the health information or the generated health parameter(s).

The system 300 may include one or more entities that may directly or indirectly interact or communicate with the vehicle 305-a (e.g., and the host device 105 of the vehicle 305-a). The system 300 may support communication of health information (e.g., one or more parameters indicative of the status of the memory device 110, as determined by the memory device 110 or the host device 105) between different entities, to support information tracking and decision-making based on the health information. For example, the entities of the system 300 may each be associated with one or more respective devices, where a device may communicate with one or more other devices (e.g., of other entities) via a communication link 335. A communication link 335 may represent one or more modes of communication. For example, a communication link 335 may represent one or more forms of wireless communication, such as wireless local area network (WLAN) communications, vehicle-to-everything (V2X) communications, cellular V2X (C-V2X) communications, communications via a Bluetooth link, or any combination thereof. Additionally or alternatively, a communication link 335 may represent one or more forms of wired communication, such as communications via an onboard diagnostics port (OBDx), via a universal serial bus (USB) port, via a secure digital (SD) card slot, via an ethernet cable, or any combination thereof.

One or more entities of the system 300 may receive, or interpret, or both the health information and may use the health information for decision making (e.g., safety-related decision making) and design improvements (e.g., hardware design improvements), among other examples. For example, the system 300 may include a vehicle 305-*b*, which may communicate with the vehicle 305-*a* via a communication link 335-*a*. The communication link 335-*a* may represent, for example, a V2X type of communication link, or other wireless communication link 335. The vehicle 305-*b* may use the health information received via communication link 335-*a* to make safety-related driving decisions. For example, vehicle 305-*a* may transmit, to vehicle 305-*b*, health information indicating a failing memory device in the vehicle 305-*a* (e.g., or an estimate failure time), and may make navigation decisions for collision avoidance based on the received information.

In some cases, the system 300 may include one or more devices associated with a servicing entity 310, which may communicate with the vehicle 305-*a* via one or more respective communication links 335-*c*. The communication link(s) 335-*c* may represent, for example, any type of wired or wireless communication link 335. The servicing entity 310 (e.g., a dealership, repair shop) may conduct hardware maintenance, software maintenance, or replacement of parts of the vehicle 305-*a*. The vehicle 305-*a* may transmit the health information to the one or more devices of the servicing entity 310, and the servicing entity 310 may use the health information to determine when the vehicle 305-*a* is to be serviced. For example, a device of the servicing entity 310, or a user of a device (e.g., an employee), may determine one or more servicing dates for the vehicle 305-*a* based on the health information. A device of the servicing entity 310 may inform the vehicle 305-*a* (e.g., in order to inform a user or driver of the vehicle) of the one or more servicing dates via the communication link 335-*c*.

In some cases, the system 300 may include one or more devices of an infrastructure entity 315, which may communicate with the vehicle 305-*a* via one or more respective communication links 335-*b*. The communication link(s) 335-*b* may represent, for example, a V2X type of link, or other wireless communication link 335. The infrastructure entity 315 may, for example, be associated with a roadway or other construction entity (e.g., government-operated construction entity) that monitors vehicle activity. In some cases, the infrastructure entity 315 may be an entity, or may be controlled by an entity, which may also operate a data center 330 (e.g., to store data used in national time-to-failure models). The infrastructure entity 315 (e.g., one or more devices thereof) may receive data, such as memory health information, from multiple vehicles 305 (e.g., including vehicle 305-*a*, via V2X or other signaling). For example, the infrastructure entity 315 (e.g., a device or an employee thereof) may monitor a remaining life on vehicle systems (e.g., safety-critical systems, such as memory) for safety purposes. In some cases, the infrastructure entity 315 may additionally collect population data about vehicles 305 within an area for various applications (e.g., traffic predictions).

In other examples, the infrastructure entity 315 (e.g., a device or an employee thereof) may monitor vehicle traffic in order to assess and manage risk to pedestrians or make traffic routing decisions. The infrastructure entity 315 (e.g., a device or an employee thereof) may process the data (e.g., health information) received from the vehicles 305, and may use the health information to determine a remaining life of vehicle systems (e.g., associated with a respective SoC of a vehicle 305 or a system of a vehicle 305).

In some cases, the system 300 may include one or more devices associated with a cloud 325, which may communicate with the vehicle 305-*a* via one or more respective communication links 335-*d*. The communication link(s) 335-*d* may represent, for example, any type of wired or wireless communication link 335, and in some cases, the communication links 335 may include communications via one or more other devices (e.g., such as other devices of the system 300). The cloud 325 may represent a data storage site (e.g., public data storage site) and may provide off-premise computing resources to the vehicle 305-*a*, or to any other entities of the system 300. The system 300 may use the cloud 325 for non-volatile data storage, such as for storing vehicle maintenance, wear, usage, traffic, and other information (e.g., memory health information). In cases where the cloud 325 is used for storing the health information, the vehicle 305-*a* may transmit the health information to the cloud 325 (e.g., to one or more devices thereof), and other ecosystem entities may access the health information via the cloud 325.

In some cases, the system 300 may include a one or more devices of a fleet manager 320, which may communicate with the cloud 325 via one or more respective communication links 335-*e*. The communication link(s) 335-*e* may represent, for example, any type of wired or wireless communication link 335, and in some cases, the communication link(s) 335-*e* may include communications via one or more other devices (e.g., such as other devices of the system 300). In some cases, the fleet manager 320 may coordinate (e.g., communicate) with the vehicle 305-*a* wirelessly, for example, via the cloud 325. In some other cases, the fleet manager 320 (e.g., one or more devices thereof) may communicate directly with the vehicle 305-*a* via an additional communication link 335, which may represent a wired or wireless link.

The fleet manager 320 may represent a managing entity for a group of related devices, which may include vehicles 305 (e.g., an autonomous vehicle company, a trucking company, a taxi service), which may include vehicle 305-*a*. The fleet manager 320 (e.g., one or more devices or employees thereof) may monitor the health of memory-related hardware of the vehicles 305 (e.g., including vehicle 305-*a*) by tracking and analyzing health information (e.g., health information received over a time period). For example, the one or more devices of the fleet manager 320 may receive the health information from the vehicle 305-*a* via communication link 335-*e* (e.g., via the cloud 325), or via another communication link 335. The fleet manager 320 (e.g., one or more devices or employees thereof) may make fleet health decisions (e.g., hardware replacement, scheduling maintenance or vehicle downtime) based on the health information. The fleet manager 320 (e.g., one or more devices or employees thereof) may also perform cost analysis of various functions of the vehicle 305-*a* or of the fleet of vehicles 305 using the health information (e.g., may determine when to replace a memory device 110).

In some cases, the system 300 may include one or more devices of a data center 330, which may communicate with the cloud 325 via one or more respective communication links 335-*f*. The communication link(s) 335-*f* may represent, for example, any type of wired or wireless communication link 335, and in some cases, the communication link(s) 335-*f* may include communications via one or more other devices (e.g., such as other devices of the system 300). In some cases, the data center 330 may coordinate with the vehicle 305-*a* via the cloud 325. In some other cases, the data center 330 may communicate directly with the vehicle 305-*a* (e.g., may receive health information) via an additional communication link 335 (e.g., a wired or wireless communication link 335). The data center 330 may be an on-premise site for non-volatile data storage and computing resources, that may be associated with any of the entities of the system 300, among other entities. For example, the fleet manager 320, infrastructure entity 315, servicing entity 310, or vehicle 305-*a* may use a data center 330 to store health information or other information related to vehicles 305. In some cases, storing data at the data center 330 may be more secure or more reliable than storing data using cloud storage at the cloud 325.

In some cases, the system 300 may include one or more other entities that may be associated with (e.g., link to the system 300 via) a data center 330. For example, the system 300 may include a vehicle original equipment manufacturer (OEM), a system component supplier (e.g., a supplier of one or more systems of a vehicle 305), a system integrator (e.g., a designer or integrator for a vehicle 305), a memory vendor (e.g., for the memory device 110), a government entity, an SoC of one or more vehicles 305, etc. The makeup of the system 300 may vary on a case-by-case basis, and any combination of the entities described herein may make up a system 300. One or more of the entities of the system 300 may access the health information via the cloud 325, or may receive the health information from vehicle 305-*a* (e.g., the host device 105) and may store, or process, or both that data at an onsite data center, such as the data center 330.

For example, an SoC, which may be an example of a host device 105, may use a data center 330 to store, or process, or both health information. The SoC may use the data center 330 for memory traffic optimization, or for functions related to the thermal capabilities of the SoC (e.g., thermal assumption validation and thermal solution optimization), among other examples. In some cases, the SoC may use the data center 330 to log memory security issues (e.g., for future reference or access).

In another example, the memory vendor (e.g., memory designer and/or manufacturer of the memory device 110), which may be an entity of the system 300, may use a data center 330 to store, or process, or both health information. The memory vendor may use the data center 330 to store information such as a usage of the memory device 110 (e.g., detailed functional use of the memory system), or environmental conditions (e.g., system conditions) during use of the memory device 110, among other examples. The memory vendor (e.g., one or more devices or employees thereof) may use the health information stored at the data center 330 (e.g., received from the host device 105) for validation processes (e.g., validation of system assumptions, temperature profiles, degradation curves) or for optimizing designs and/or processes. In some cases, the memory vendor may use the health information to create degradation curves to help predict when or under what circumstances memory devices 110 may fail. In some cases, the memory vendor may use the health information to update a design or manufacturing process for memory devices 110 (e.g., in order to improve the memory devices 110).

In some cases, one or more devices of, for example, the memory vendor or OEM may make up a computing system 340 (e.g., a DRAM or memory computing system). This computing system 340 (e.g., one or more devices thereof) may, in some examples, receive the health information from the host device 105, determine how to interpret the health information, and provide a response or a communication back to the host device 105. The computing system 340 may communicate with the vehicle 305-*a* via one or more respective communication links 335-*g*. The communication link(s) 335-*f* may represent, for example, any type of wired or wireless communication link 335, and in some cases, the communication link(s) 335-*g* may include communications via one or more other devices (e.g., other devices of the system 300, such as the data center 330). The computing system 340 may determine, based on the received health information, one or more second parameters (e.g., operational parameters) for operation of the memory device 110 (e.g., one or more trip points, sense levels, voltage levels, time periods, or any combination thereof, for operation of the memory device 110). The computing system 340 may indicate the one or more second parameters (e.g., operational parameters) to the host device 105, which may indicate information, such as the one or more operational parameters, to the memory device 110.

In some cases, the memory device 110 and the computing system 340 may communicate directly with each other, via the host device 105. For example, the memory device 110 may transmit the health information to the host device 105, with an indication for the host device 105 to forward the health information to the computing system 340. Upon receiving the health information and the indication from the memory device 110, the host device 105 may forward the health information to the computing system 340. Such operations may be referred to as a "write through" or a "pass through" via the host device 105. In some examples, the computing system 340 may indicate the one or more second parameters (e.g., operational parameters) to the memory device 110 (or both to the memory device 110 and the host device 105 separately or concurrently), for example, using a "write through" via the host device 105. In such cases, the computing system may transmit the indication of the one or more second parameters to the host device 105, with an indication for the host device 105 to forward the one or more second parameters to the memory device 135. Upon receiving the second parameter(s) from the computing system 340, the host device 105 may forward the second parameter(s) to the memory device 110.

In some cases, the health information may be tracked by the memory computing system using an identifier (ID) of the memory device 110. For example, the host device 105 may transmit, to the memory computing system (e.g., among other devices or entities of the system 300) an ID indicating an identity of the memory device 110. The ID may be transmitted together with the health information, or in a different communication than the health information, and may indicate an association between the health information and the corresponding memory device 110.

In another example, the vehicle OEM (e.g., a designer and/or manufacturer of a vehicle, such as vehicle 305-*a* or another vehicle), which may be an entity of the system 300, may use a data center 330 to store, or process, or both health information. The vehicle OEM may, for example, use the health information (e.g., received from the host device 105, such as via the data center 330) for validation processes or for planning future products based on lifetime curves and environmental conditions, among other examples. For example, in some cases, the vehicle OEM may use the health information to validate robustness of onboard memory devices, or to validate a system integrator's solutions for thermal management. The system integrator may also be an entity of the system 300 and may also use a data center 330 to store, or process, or both health information (e.g., as received from the host device 105). The system integrator may use the health information to validate design of onboard systems, to validate thermal management, or to produce time-to-failure models for onboard systems, among other options.

In some cases, a device of an entity of the system 300 may transmit a response to the vehicle 305-a based on the received, or accessed, health information. For example, the device may indicate one or more second parameters (e.g., operational parameters) for the host device 105 to implement with or for the memory device 110 (e.g., as determined by the device, by another device associated with the entity, or by a user or employee associated with the entity). The one or more operational parameters may be configured to increase a life of the memory device 110, decrease a level of wear of the memory device 110, or assist with the interaction of the vehicle 305-a with other entities of the system 300 (e.g., servicing schedules, traffic decisions, other scheduling decisions, memory device replacement), among other examples. In some cases, as described herein, the operational parameters may include one or more trip points, sense levels, voltage levels, time periods, or any combination thereof, for operation of the memory device 110, among other examples.

Figure 4:
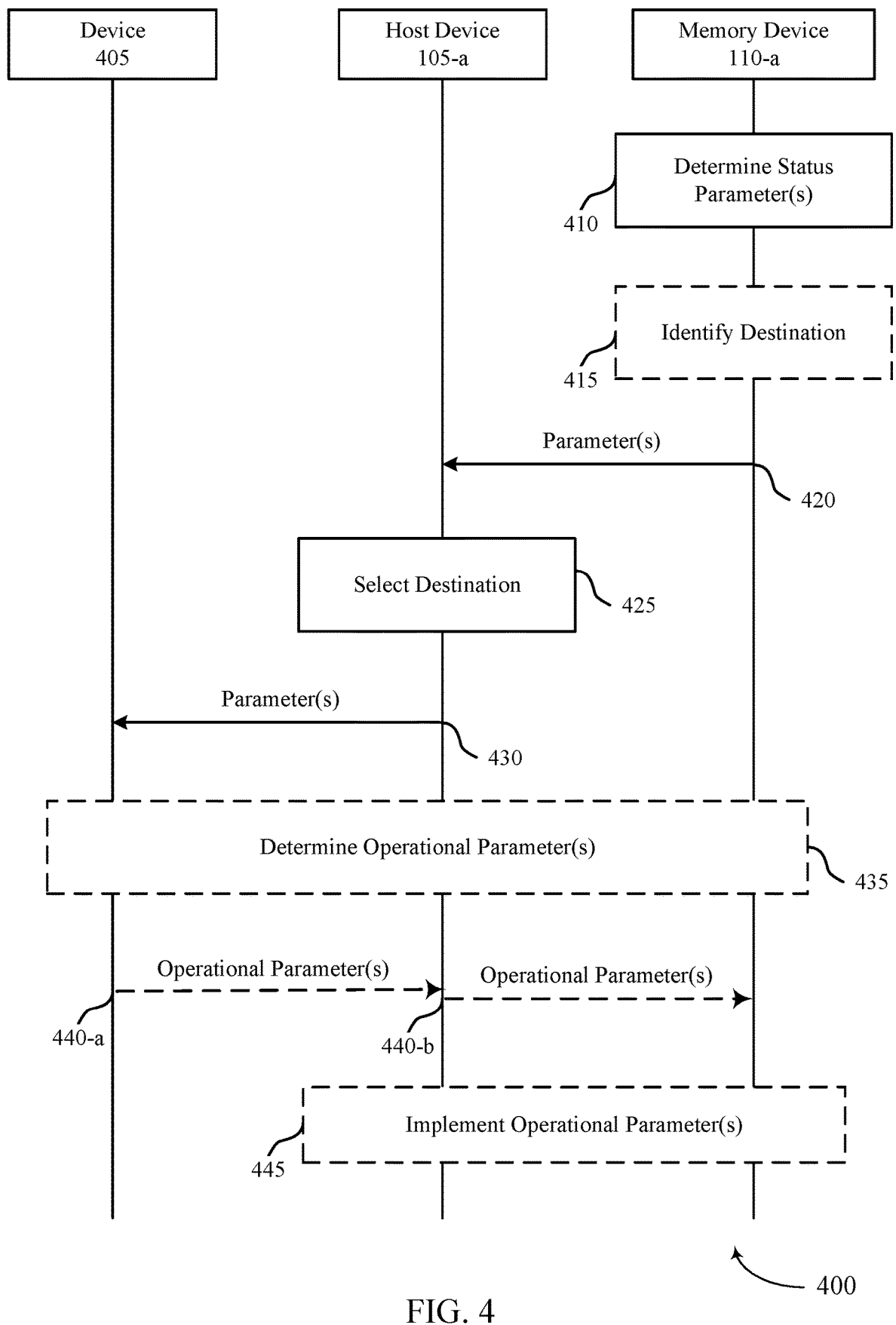
FIG. 4 illustrates an example of a process flow that supports inter-device communications for memory health monitoring in accordance with examples as disclosed herein.

FIG. 4 illustrates an example of a process flow 400 that supports inter-device communications for memory health monitoring in accordance with examples as disclosed herein. The process flow 400 may be implemented by a host device 105-a and a memory device 110-a, which may be examples of the respective devices described with reference to FIGS. 1-3. The process flow 400 may also be implemented by a device 405, which may be an example of a device of an system entity (e.g., as described with reference to FIG. 3). The host device 105-a and the memory device 110-a may be coupled via a physical or logical bus, such as channels 115, that may support signaling between the devices. The host device 105-a may additionally be operable to communicate with the device 405 via a communication link (e.g., a communication link 335 as described with reference to FIG. 3). The memory device 110-a may illustrate an example of an apparatus that includes an array of memory cells 205 couplable to a set of pins (e.g., bus) with a processor or SoC (e.g., of the host device 105-a) and configured to operate in response to commands from the processor or the SoC.

In the following description of process flow 400, the operations may be performed in a different order than the order shown, or the operations performed by memory device 110-a, host device 105-a, and the device 405 may be performed in different orders or at different times. For example, specific operations may also be left out of process flow 400, or other operations may be added to process flow 400. Although memory device 110-a, host device 105-a, and the device 405 are shown performing the operations of process flow 400, some aspects of some operations may also be performed by one or more other wireless devices.

At 410, the memory device 110-a may determine one or more parameters indicative of a status of the memory device 110-a (e.g., may determine health information for the memory device 110-a). The parameter(s) may, for example, be associated with a level of wear of a component of the memory device 110-a or a degradation of a component of the memory device 110-a, or both. The parameter(s) may be measured or determined by monitoring circuitry of the memory device 110-a, among other examples, and may represent or be associated with a voltage, a current, a timing, an amount of time, a temperature, a degradation, or other parameters of a component of the memory device 110-a, or any combination thereof. The monitoring circuitry of the memory device 110-a may be configured to monitor such parameters, among other examples.

At 415, in some cases, the memory device 110-a may identify a destination for communicating the parameter(s). For example, the memory device 110-a may identify the destination from a set of multiple devices (e.g., within a system) that are external to the memory device 110-a. The memory device 110-a may identify the host device 105-a as the destination and/or may identify a destination other than the host device 105-a (e.g., an entity of the system 300 described with reference to FIG. 3). The memory device 110-a may identify the destination based on a type or category of the one or more parameters and/or a respective value of the one or more parameters.

For example, the memory device 110-a may identify that a parameter indicating a relatively high temperature for the memory device 110-a may be transmitted to a destination associated with handling temperature data, a destination associated with safety data, or both. In such cases, the memory device 110-a may identify a destination of one or more of a user alert system (e.g., associated with the host device 105-a), a data center associated with a memory vendor, a data center associated with a vehicle OEM, a fleet manager, or a servicing entity. A device associated with one or more of these entities may be an example of a device 405.

At 420, the memory device 110-a may transmit, to the host device 105-a, an indication of the one or more parameters. In some cases, if the memory device 110-a has identified a destination for the parameter(s) outside of the host device 105-a, the memory device 110-a may indicate the device 405 as the destination for the one or more parameters. In some cases, the indication of the one or more parameters and the indication of the destination may be part of a same transmission. In some cases, the indication of the one or more parameters and the indication of the destination may be transmitted separately to the host device 105-a.

At 425, the host device 105-a may select a destination for communicating the parameter(s) based on receiving the parameter(s) (e.g., alone or based on an indication from the memory device 110-a of a propose identified a destination for the parameter(s)). The destination may, for example, be one of a set of multiple devices external to the memory device 110-a (e.g., within a system that includes the host device 105-a and the memory device 110-a). In some cases, the host device 105-a may select the destination based on the indication from the memory device 110-a of the identified destination. In some cases, the host device 105-a may select the destination based on the type or category of the parameter(s) or a value of the parameter(s) or both. For example, the host device 105-a may select the device 405 as the destination based on the device 405 being associated with an entity that corresponds to or uses the parameter(s). In some cases, as described herein, a category of the parameter(s) may determine the destination, or a value (e.g., a high or low value, that satisfies a threshold) of the parameter(s) may indicate the destination. For example, a parameter that satisfies a threshold may indicate a safety parameter, or a type of failure, which may be communicated to a corresponding entity, or destination device.

At 430, the host device 105-a may transmit the one or more parameters to the device 405, for example, based on selecting the device 405 as the destination (e.g., from the set of multiple devices in the system). As described herein, the host device 105-a may use one or more communication methods for transmitting the one or more parameters, such as WLAN, V2X, Bluetooth, an OBDx, a USB port, an SD card slot, or an ethernet cable, among other examples. In some cases, the host device 105-*a* may transmit the parameter(s) immediately after receiving them from the memory device 110-*a* (e.g., via a wireless communication link such as V2X). In some cases, the host device 105-*a* may store the parameter(s) as data in volatile or non-volatile storage before transmitting the one or more parameters. In some cases, the host device 105-*a* may transmit, to the device, an indication of an identity of the memory device 110-*a*, for example, in association with the one or more parameters.

In some cases, the host device 105-*a* may convert the indication of the parameter(s) (e.g., received from the memory device 110-*a*) to data indicative of the one or more parameters (e.g., for transmission to the device 405). In some cases, the host device 105-*a* may identify a trigger for transmitting the one or more parameters to the device 405, and may transmit the parameter(s) based on identifying the trigger. For example, the trigger may be a time, such as a time of day or a day of the month, or in some cases, a power down time. Additionally or alternatively, the trigger may be an external indication or message, received by the host device 105-*a* (e.g., from the device 405 or another device), and indicating for the host device 105-*a* to transmit the parameter(s). In some cases, the trigger may be a location of the host device 105-*a*. For example, the host device 105-*a* may transmit the one or more parameters when located near an associated entity or when within a distance of the entity (e.g., within a threshold distance to the device 405). In some cases, the trigger may be a power down process performed by the host device 105-*a*, such that the host device 105-*a* may transmit the one or more parameters before powering down, or as a part of a power down sequence.

At 435, in some cases, the device 405, the host device 105-*a*, and/or the memory device 110-*a* may determine one or more other parameter(s) for operation of the memory device 110-*a* (e.g., operational parameter(s)) based on the parameter(s) associated with the status of the memory device 110-*a*. In a first example, one or more of the devices (e.g., the device 405, the host device 105-*a*, or the memory device 110-*a*) may independently determine the operational parameter(s). For example, the memory device 110-*a* may determine one or more operational parameters for performing operations at the memory device 110-*a*, or the host device 105-*a* or device 405 may determine one or more operational parameters for performing access operations at the memory device 110-*a*.

In a second example, the devices may determine the operational parameter(s) together. For example, the device 405 and the host device 105-*a* may exchange communications to determine the operational parameter(s) for performing access operations at the memory device 110-*a*, or the host device 105-*a* and the memory device 110-*a* may exchange communications to determine the operational parameter(s) for performing access or other operations at the memory device 110-*a*. Determining the operational parameter(s) may take place at any time after a respective device receives or determines the status parameter(s).

The determined operational parameter(s) may vary depending on the status parameter(s) or, in some cases, the entity associated with the device 405. The device 405 may, for example, use one or more categories of status parameters to determine the operational parameter(s). In some cases, the device 405 may use one or more status parameters such as temperature profile or functional usage of memory (e.g., read/write ratios, time active, time in power down). For example, in a case where the device 405 may be a data center operated by a memory vendor, these parameters may be relevant to operational parameters related to tracking the usage data of sold products. In some cases, the device 405 may use one or more other status parameters related to memory usage, such as usage outside of an allowed operation (e.g., security related threats). For example, in a case where the device 405 may be a servicing entity, this category of parameter may be relevant to determining how to repair or service the host device 105-*a* or the memory device 110-*a*.

At 440-*a*, in some cases, the device 405 may transmit the one or more operational parameters to the host device 105-*a*. For example, the device 405 may transmit the operational parameter(s) as determined by the device 405, or as indicated to the device (e.g., by another device associated with a same entity, or by a user of the device 405). At 440-*b*, in some cases, the host device 105-*a* may transmit the operational parameter(s) to the memory device 110-*a*. For example, the host device 105-*a* may transmit the operational parameter(s) as received from the device 405 or as determined by the host device 105-*a*.

At 445, the host device 105-*a*, the memory device 110-*a*, or both, may implement the operational parameter(s). For example, the memory device 110-*a* may implement the operational parameter(s) received from the host device 105-*a*, or from the device 405 via the host device 105-*a*, or as determined by the memory device 110-*a*, or any combination thereof. Additionally or alternatively, the host device 105-*a* may implement the operational parameter(s) received from the device 405, such as with the memory device 110-*a* or when performing an access operation at the memory device 110-*a*.

In some cases, the memory device 110-*a*, the host device 105-*a*, or both, may indicate a response to the one or more received operational parameters. For example, the memory device 110-*a* may determine to request or implement an adjustment or change to the operational parameter(s) and may notify the host device 105-*a* (e.g., notify of the change or request the change). Additionally or alternatively, the host device 105-*a* may determine to request or implement an adjustment or change to the operational parameter(s) and may notify the device 405 (e.g., notify of the change or request the change), or may notify the device of the change requested or implemented by the memory device 110-*a*. In some cases, the host device 105-*a*, the device 405, or both, may adjust the operational parameter(s) based on the additional communication, or may determine to maintain the operational parameter(s). In either case, the host device 105-*a*, the device 405, or both, may respectively notify the memory device 110-*a* or the host device of the adjustment or the determination to maintain.

Figure 5:
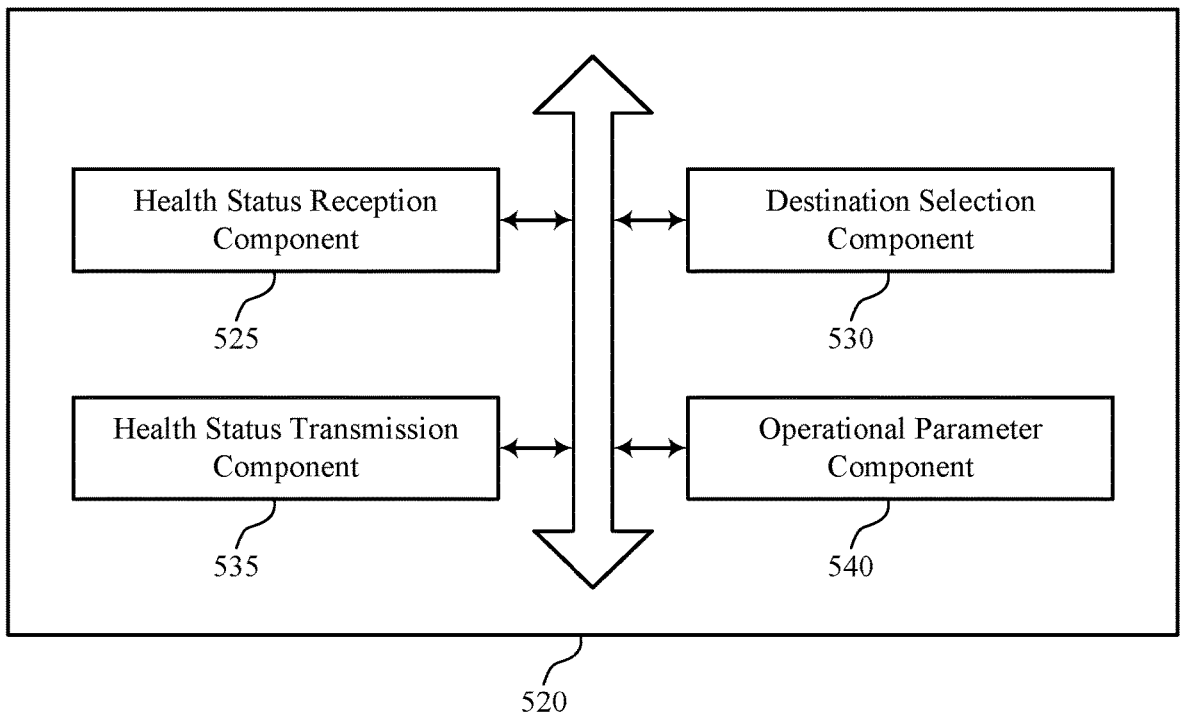
FIG. 5 shows a block diagram of a memory device that supports inter-device communications for memory health monitoring in accordance with examples as disclosed herein.

FIG. 5 shows a block diagram 500 of a host device 520 that supports inter-device communications for memory health monitoring in accordance with examples as disclosed herein. The host device 520 may be an example of aspects of a host device as described with reference to FIGS. 1 through 4. The host device 520, or various components thereof, may be an example of means for performing various aspects of inter-device communications for memory health monitoring as described herein. For example, the host device 520 may include a health status reception component 525, a destination selection component 530, a health status transmission component 535, an operational parameter component 540, or any combination thereof. Each of these components may communicate, directly or indirectly, with one another (e.g., via one or more buses).

The health status reception component 525 may be configured as or otherwise support a means for receiving, at the host device from a memory device, an indication of one or more parameters indicative of a status of the memory device. The destination selection component 530 may be configured as or otherwise support a means for selecting a destination from a set of multiple devices external to the memory device and for communicating the one or more parameters based on receiving the indication of the one or more parameters. The health status transmission component 535 may be configured as or otherwise support a means for transmitting the one or more parameters to a device of the set of multiple devices based on selecting the destination from the set of multiple devices external to the memory device and for communicating the one or more parameters, the set of multiple devices being different than the host device.

In some examples, the health status reception component 525 may be configured as or otherwise support a means for storing the indication of the one or more parameters in non-volatile memory associated with the host device based on receiving the indication of the one or more parameters, where transmitting the one or more parameters to the device is based on storing the indication of the one or more parameters.

In some examples, the health status transmission component 535 may be configured as or otherwise support a means for converting the indication of the one or more parameters to data indicative of the one or more parameters, where transmitting the one or more parameters to the device is based on converting the indication of the one or more parameters. In some examples, the health status transmission component 535 may be configured as or otherwise support a means for identifying a trigger for transmitting the one or more parameters to the device, where transmitting the one or more parameters is based on identifying the trigger. In some examples, the trigger includes a time, a location of the host device or of the device, a distance to the device, a power state of the host device, reception of a message from the device, or any combination thereof.

In some examples, the operational parameter component 540 may be configured as or otherwise support a means for determining one or more second parameters associated with operation of the memory device based on the indication of the one or more parameters indicative of the status of the memory device. In some examples, the operational parameter component 540 may be configured as or otherwise support a means for performing an access operation with the memory device based on the one or more second parameters.

In some examples, the operational parameter component 540 may be configured as or otherwise support a means for receiving, from the device, one or more second parameters associated with operation of the memory device based on transmitting the one or more parameters indicative of the status of the memory device. In some examples, the operational parameter component 540 may be configured as or otherwise support a means for performing an access operation with the memory device based on the one or more second parameters. In some examples, the operational parameter component 540 may be configured as or otherwise support a means for transmitting an indication of the one or more second parameters to the memory device based on receiving the one or more second parameters. In some examples, the one or more second parameters include a trip point, a sense level, a voltage level, a time period, or any combination thereof. In some examples, the one or more second parameters are based on an identity of the memory device.

In some examples, to support selecting the destination, the destination selection component 530 may be configured as or otherwise support a means for selecting the device as the destination based on the device being associated with an entity of an ecosystem that includes the host device and the device, the entity associated with the one or more parameters.

In some examples, to support selecting the destination, the destination selection component 530 may be configured as or otherwise support a means for selecting the device as the destination based on a category of memory device usage associated with the one or more parameters, the category corresponding to the device.

In some examples, to support receiving the indication of the one or more parameters, the health status reception component 525 may be configured as or otherwise support a means for accessing a register of the memory device, where the register includes the indication of the one or more parameters.

In some examples, to support transmitting the one or more parameters, the health status transmission component 535 may be configured as or otherwise support a means for transmitting the one or more parameters to the device via a wired connection or a wireless connection. In some examples the health status transmission component 535 may be configured as or otherwise support a means for transmitting, to the device, an indication of an identity of the memory device in association with the one or more parameters.

In some examples, the one or more parameters are indicative of a lifetime of the memory device, a level of wear of the memory device, one or more operating conditions at the memory device, or any combination thereof.

Figure 6:
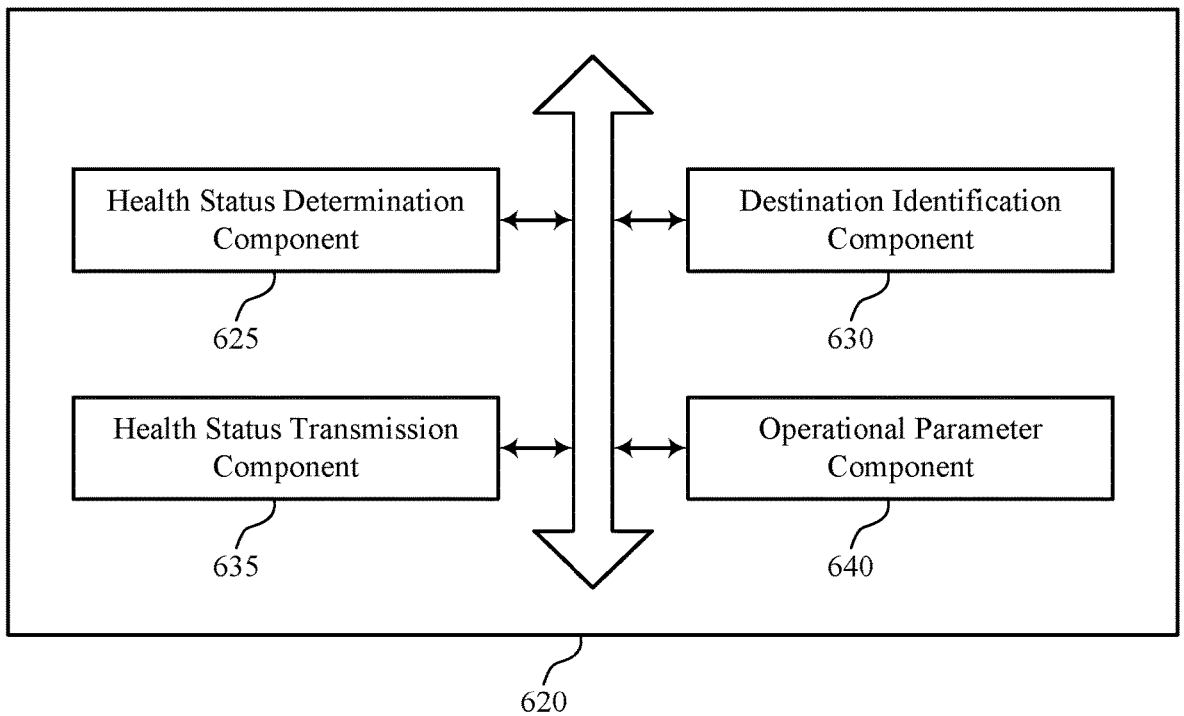
FIG. 6 shows a block diagram of a host device that supports inter-device communications for memory health monitoring in accordance with examples as disclosed herein.

FIG. 6 shows a block diagram 600 of a memory device 620 that supports inter-device communications for memory health monitoring in accordance with examples as disclosed herein. The memory device 620 may be an example of aspects of a memory device as described with reference to FIGS. 1 through 4. The memory device 620, or various components thereof, may be an example of means for performing various aspects of inter-device communications for memory health monitoring as described herein. For example, the memory device 620 may include a health status determination component 625, a destination identification component 630, a health status transmission component 635, an operational parameter component 640, or any combination thereof. Each of these components may communicate, directly or indirectly, with one another (e.g., via one or more buses).

The health status determination component 625 may be configured as or otherwise support a means for determining, at a memory device, one or more parameters indicative of a status of the memory device. The destination identification component 630 may be configured as or otherwise support a means for identifying a destination from a set of multiple devices external to the memory device and for communicating the one or more parameters based on determining the one or more parameters indicative of the status of the memory device. The health status transmission component 635 may be configured as or otherwise support a means for transmitting, to a host device, an indication of the one or more parameters and an indication of a device of the set of multiple devices as the destination for the one or more parameters, the set of multiple devices being different than the host device.

In some examples, the operational parameter component 640 may be configured as or otherwise support a means for determining one or more second parameters associated with operation of the memory device based on determining the one or more parameters indicative of the status of the memory device. In some examples, the operational parameter component 640 may be configured as or otherwise support a means for performing an operation of the memory device based on the one or more second parameters.

In some examples, the operational parameter component 640 may be configured as or otherwise support a means for receiving, from the host device, an indication of one or more second parameters associated with operation of the memory device based on transmitting the indication of the one or more parameters indicative of the status of the memory device. In some examples, the operational parameter component 640 may be configured as or otherwise support a means for performing an operation of the memory device based on the one or more second parameters.

In some examples, to support identifying the destination, the destination identification component 630 may be configured as or otherwise support a means for identifying the device as the destination based on the device being associated with an entity of an ecosystem that includes the host device and the device, the entity associated with the one or more parameters.

In some examples, to support identifying the destination, the destination identification component 630 may be configured as or otherwise support a means for identifying the device as the destination based on a category of memory device usage associated with the one or more parameters, the category corresponding to the device.

In some examples, the one or more parameters are indicative of a lifetime of the memory device, a level of wear of the memory device, one or more operating conditions at the memory device, or any combination thereof.

Figure 7:
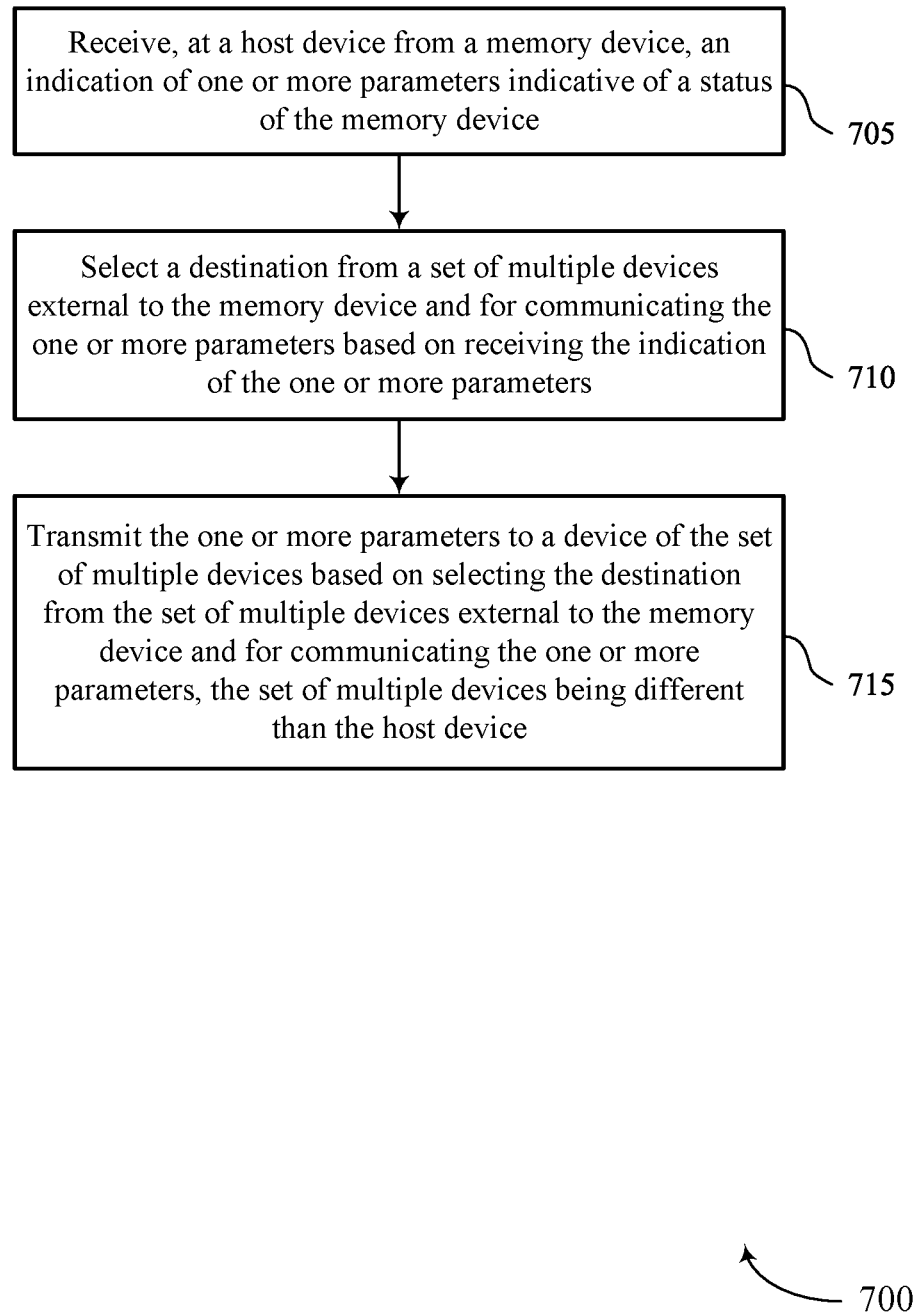
FIGS. 7 and 8 show flowcharts illustrating a method or methods that support inter-device communications for memory health monitoring in accordance with examples as disclosed herein.

FIG. 7 shows a flowchart illustrating a method 700 that supports inter-device communications for memory health monitoring in accordance with examples as disclosed herein. The operations of method 700 may be implemented by a host device or its components as described herein. For example, the operations of method 700 may be performed by a host device as described with reference to FIGS. 1 through 5. In some examples, a host device may execute a set of instructions to control the functional elements of the device to perform the described functions. Additionally or alternatively, the host device may perform aspects of the described functions using special-purpose hardware.

At 705, the method may include receiving, at a host device from a memory device, an indication of one or more parameters indicative of a status of the memory device. The operations of 705 may be performed in accordance with examples as described with reference to FIGS. 3 and 4. In some examples, aspects of the operations of 705 may be performed by a health status reception component 525 as described with reference to FIG. 5.

At 710, the method may include selecting a destination from a set of multiple devices external to the memory device and for communicating the one or more parameters based on receiving the indication of the one or more parameters. The operations of 710 may be performed in accordance with examples as described with reference to FIGS. 3 and 4. In some examples, aspects of the operations of 710 may be performed by a destination selection component 530 as described with reference to FIG. 5.

At 715, the method may include transmitting the one or more parameters to a device of the set of multiple devices based on selecting the destination from the set of multiple devices external to the memory device and for communicating the one or more parameters, the set of multiple devices being different than the host device. The operations of 715 may be performed in accordance with examples as described with reference to FIGS. 3 and 4. In some examples, aspects of the operations of 715 may be performed by a health status transmission component 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, at a host device from a memory device, an indication of one or more parameters indicative of a status of the memory device, selecting a destination from a set of multiple devices external to the memory device and for communicating the one or more parameters based on receiving the indication of the one or more parameters, and transmitting the one or more parameters to a device of the set of multiple devices based on selecting the destination from the set of multiple devices external to the memory device and for communicating the one or more parameters, the set of multiple devices being different than the host device.

Some examples of the method 700 and the apparatus described herein may further include operations, features, circuitry, logic, means, or instructions for storing the indication of the one or more parameters in non-volatile memory associated with the host device based on receiving the indication of the one or more parameters, where transmitting the one or more parameters to the device may be based on storing the indication of the one or more parameters.

Some examples of the method 700 and the apparatus described herein may further include operations, features, circuitry, logic, means, or instructions for converting the indication of the one or more parameters to data indicative of the one or more parameters, where transmitting the one or more parameters to the device may be based on converting the indication of the one or more parameters.

Some examples of the method 700 and the apparatus described herein may further include operations, features, circuitry, logic, means, or instructions for identifying a trigger for transmitting the one or more parameters to the device, where transmitting the one or more parameters may be based on identifying the trigger. In some examples of the method 700 and the apparatus described herein, the trigger includes a time, a location of the host device or of the device, a distance to the device, a power state of the host device, reception of a message from the device, or any combination thereof.

Some examples of the method 700 and the apparatus described herein may further include operations, features, circuitry, logic, means, or instructions for determining one or more second parameters associated with operation of the memory device based on the indication of the one or more parameters indicative of the status of the memory device and performing an access operation with the memory device based on the one or more second parameters.

Some examples of the method 700 and the apparatus described herein may further include operations, features, circuitry, logic, means, or instructions for receiving, from the device, one or more second parameters associated with operation of the memory device based on transmitting the one or more parameters indicative of the status of the memory device and performing an access operation with the memory device based on the one or more second parameters.

In some examples of the method 700 and the apparatus described herein, selecting the destination may include operations, features, circuitry, logic, means, or instructions for selecting the device as the destination based on the device being associated with an entity of an ecosystem that includes the host device and the device, the entity associated with the one or more parameters.

In some examples of the method 700 and the apparatus described herein, selecting the destination may include operations, features, circuitry, logic, means, or instructions for selecting the device as the destination based on a category of memory device usage associated with the one or more parameters, the category corresponding to the device.

In some examples of the method 700 and the apparatus described herein, receiving the indication of the one or more parameters may include operations, features, circuitry, logic, means, or instructions for accessing a register of the memory device, where the register includes the indication of the one or more parameters. In some examples of the method 700 and the apparatus described herein, transmitting the one or more parameters may include operations, features, circuitry, logic, means, or instructions for transmitting the one or more parameters to the device via a wired connection or a wireless connection. In some examples of the method 700 and the apparatus described herein, the one or more parameters may be indicative of a lifetime of the memory device, a level of wear of the memory device, one or more operating conditions at the memory device, or any combination thereof.

Figure 8:
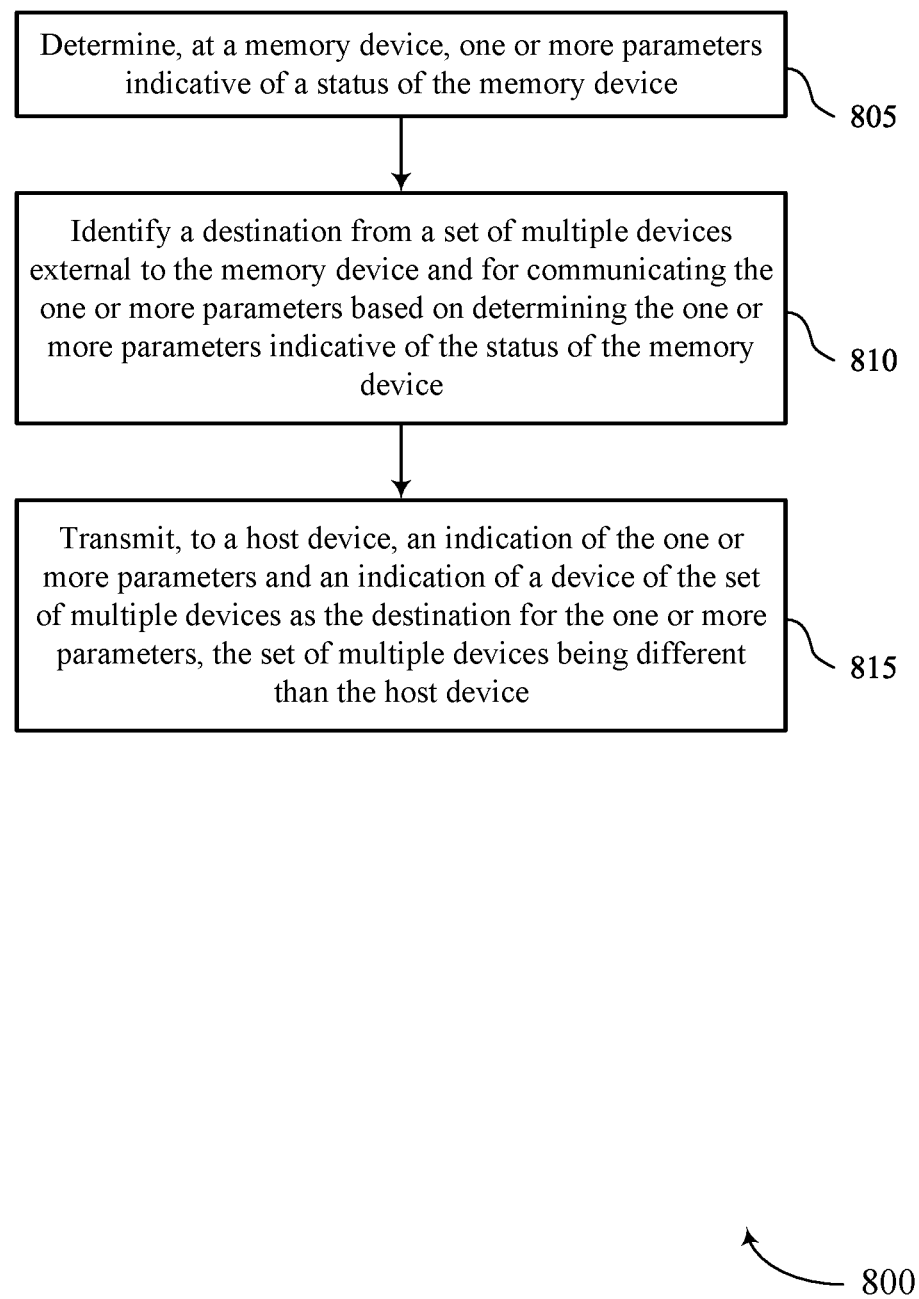

FIG. 8 shows a flowchart illustrating a method 800 that supports inter-device communications for memory health monitoring in accordance with examples as disclosed herein. The operations of method 800 may be implemented by a memory device or its components as described herein. For example, the operations of method 800 may be performed by a memory device as described with reference to FIGS. 1 through 4 and 6. In some examples, a memory device may execute a set of instructions to control the functional elements of the device to perform the described functions. Additionally or alternatively, the memory device may perform aspects of the described functions using special-purpose hardware.

At 805, the method may include determining, at a memory device, one or more parameters indicative of a status of the memory device. The operations of 805 may be performed in accordance with examples as described with reference to FIGS. 3 and 4. In some examples, aspects of the operations of 805 may be performed by a health status determination component 625 as described with reference to FIG. 6.

At 810, the method may include identifying a destination from a set of multiple devices external to the memory device and for communicating the one or more parameters based on determining the one or more parameters indicative of the status of the memory device. The operations of 810 may be performed in accordance with examples as described with reference to FIGS. 3 and 4. In some examples, aspects of the operations of 810 may be performed by a destination identification component 630 as described with reference to FIG. 6.

At 815, the method may include transmitting, to a host device, an indication of the one or more parameters and an indication of a device of the set of multiple devices as the destination for the one or more parameters, the set of multiple devices being different than the host device. The operations of 815 may be performed in accordance with examples as described with reference to FIGS. 3 and 4. In some examples, aspects of the operations of 815 may be performed by a health status transmission component 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for determining, at a memory device, one or more parameters indicative of a status of the memory device, identifying a destination from a set of multiple devices external to the memory device and for communicating the one or more parameters based on determining the one or more parameters indicative of the status of the memory device, and transmitting, to a host device, an indication of the one or more parameters and an indication of a device of the set of multiple devices as the destination for the one or more parameters, the set of multiple devices being different than the host device.

Some examples of the method 800 and the apparatus described herein may further include operations, features, circuitry, logic, means, or instructions for determining one or more second parameters associated with operation of the memory device based on determining the one or more parameters indicative of the status of the memory device and performing an operation of the memory device based on the one or more second parameters.

Some examples of the method 800 and the apparatus described herein may further include operations, features, circuitry, logic, means, or instructions for receiving, from the host device, an indication of one or more second parameters associated with operation of the memory device based on transmitting the indication of the one or more parameters indicative of the status of the memory device and performing an operation of the memory device based on the one or more second parameters.

In some examples of the method 800 and the apparatus described herein, identifying the destination may include operations, features, circuitry, logic, means, or instructions for identifying the device as the destination based on the device being associated with an entity of an ecosystem that includes the host device and the device, the entity associated with the one or more parameters.

In some examples of the method 800 and the apparatus described herein, identifying the destination may include operations, features, circuitry, logic, means, or instructions for identifying the device as the destination based on a category of memory device usage associated with the one or more parameters, the category corresponding to the device. In some examples of the method 800 and the apparatus described herein, the one or more parameters may be indicative of a lifetime of the memory device, a level of wear of the memory device, one or more operating conditions at the memory device, or any combination thereof.

It should be noted that the methods described herein describe possible implementations, and that the operations and the steps may be rearranged or otherwise modified and that other implementations are possible. Further, portions from two or more of the methods may be combined.

A system is described. The system may include a memory device operable to determine one or more parameters indicative of a status of the memory device and transmit the one or more parameters externally from the memory device based on determining the one or more parameters and a host device coupled with the memory device and operable to receive, from the memory device, an indication of the one or more parameters indicative of the status of the memory device and transmit the one or more parameters to a device external to the memory device based on receiving the indication of the one or more parameters and determining the device as a destination for communicating the one or more parameters.

In some examples of the system, the system further includes non-volatile memory coupled with the host device, the host device further operable to store the indication of the one or more parameters in the non-volatile memory based on receiving the indication of the one or more parameters, where transmitting the one or more parameters to the device is based on storing the indication of the one or more parameters.

In some examples, the host device may be operable to convert the indication of the one or more parameters to data indicative of the one or more parameters, where transmitting the one or more parameters to the device may be based on converting the indication of the one or more parameters.

In some examples, the device may be operable to receive the one or more parameters from the host device, determine one or more second parameters associated with operation of the memory device based on the indication of the one or more parameters indicative of the status of the memory device, and transmit, to the host device, an indication of the one or more second parameters based on determining the one or more second parameters. In some examples, the host device may be operable to receive the indication of the one or more second parameters from the device and perform an access operation with the memory device based on the one or more second parameters. In some examples, the host device may be operable to receive the indication of the one or more second parameters from the device and transmit the indication of the one or more second parameters to the memory device based on receiving the indication of the one or more second parameters. In some examples, the one or more second parameters include a trip point, a sense level, a voltage level, a time period, or any combination thereof. In some examples, the one or more second parameters are based on an identity of the memory device.

In some examples, the host device may be operable to determine one or more second parameters associated with operation of the memory device based on the indication of the one or more parameters indicative of the status of the memory device and perform an access operation with the memory device based on the one or more second parameters. In some examples, the memory device may be operable to determine one or more second parameters associated with operation of the memory device based on determining the one or more parameters indicative of the status of the memory device and perform an operation of the memory device based on the one or more second parameters. In some examples, the host device may be operable to transmit, to the device, an indication of an identity of the memory device in association with the one or more parameters.

In some examples of the system, the one or more parameters may be indicative of a lifetime of the memory device, a level of wear of the memory device, one or more operating conditions at the memory device, or any combination thereof.

An apparatus is described. The apparatus may include a communication pin coupled with a memory device and a controller coupled with the communication pin and operable to cause the apparatus to receive, from the memory device, an indication of one or more parameters indicative of a status of the memory device, select a destination from a set of multiple devices external to the memory device and for communicating the one or more parameters based on receiving the indication of the one or more parameters, and transmit the one or more parameters to a device of the set of multiple devices based on selecting the destination from the set of multiple devices external to the memory device and for communicating the one or more parameters, the set of multiple devices being different than the apparatus.

In some examples, the apparatus may be operable to store the indication of the one or more parameters in non-volatile memory associated with the apparatus based on receiving the indication of the one or more parameters, where transmitting the one or more parameters to the device may be based on storing the indication of the one or more parameters. In some examples, the apparatus may be operable to convert the indication of the one or more parameters to data indicative of the one or more parameters, where transmitting the one or more parameters to the device may be based on converting the indication of the one or more parameters. In some examples, the apparatus may be operable to identify a trigger for transmitting the one or more parameters to the device, where transmitting the one or more parameters may be based on identifying the trigger.

In some examples, the apparatus may be operable to determine one or more second parameters associated with operation of the memory device based on the indication of the one or more parameters indicative of the status of the memory device and perform an access operation with the memory device based on the one or more second parameters. In some examples, the apparatus may be operable to receive, from the device, one or more second parameters associated with operation of the memory device based on transmitting the one or more parameters indicative of the status of the memory device and performing an access operation with the memory device based on the one or more second parameters.

Another apparatus is described. The apparatus may include circuitry for monitoring a status of the apparatus, a communication pin coupled with a host device, and a controller coupled with the communication pin and the circuitry, the controller operable to cause the apparatus to determine one or more parameters indicative of the status of the apparatus, identify a destination from a set of multiple devices external to the apparatus and for communicating the one or more parameters based on determining the one or more parameters indicative of the status of the apparatus, and transmit, to the host device, an indication of the one or more parameters and an indication of a device of the set of multiple devices as the destination for the one or more parameters, the set of multiple devices being different than the host device.

In some examples, the apparatus may be operable to determine one or more second parameters associated with operation of the apparatus based on determining the one or more parameters indicative of the status of the apparatus and perform an operation of the apparatus based on the one or more second parameters. In some examples, the apparatus may be operable to receive, from the host device, an indication of one or more second parameters associated with operation of the apparatus based on transmitting the indication of the one or more parameters indicative of the status of the apparatus and performing an operation of the apparatus based on the one or more second parameters.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:
   one or more memory devices comprising one or more controllers operable to:
   determine one or more parameters indicative of a status of the one or more memory devices; and
   transmit the one or more parameters externally from the one or more memory devices based at least in part on determining the one or more parameters; and
   one or more host devices coupled with the one or more memory devices, the one or more host devices operable to:
   receive, from the one or more memory devices, an indication of the one or more parameters indicative of the status of the one or more memory devices; and
   transmit the one or more parameters to a device external to the one or more memory devices and external to the one or more host devices based at least in part on receiving, from the one or more memory devices, the indication of the one or more parameters and selecting the device from a plurality of devices as a destination for communicating the one or more parameters.

2. The memory system of claim 1, wherein the memory system further comprises:
   non-volatile memory coupled with the one or more host devices, the one or more host devices further operable to:
   store the indication of the one or more parameters in the non-volatile memory based at least in part on receiving the indication of the one or more parameters, wherein transmitting the one or more parameters to the device is based at least in part on storing the indication of the one or more parameters.

3. The memory system of claim 1, wherein the one or more host devices are further operable to:
   convert the indication of the one or more parameters to data indicative of the one or more parameters, wherein transmitting the one or more parameters to the device is based at least in part on converting the indication of the one or more parameters.

4. The memory system of claim 1, comprising the device, wherein the device is operable to:
   receive the one or more parameters from the one or more host devices;
   determine one or more second parameters associated with operation of the one or more memory devices based at least in part on the indication of the one or more parameters indicative of the status of the one or more memory devices; and
   transmit, to the one or more host devices, an indication of the one or more second parameters based at least in part on determining the one or more second parameters.

5. The memory system of claim 4, wherein the one or more host devices are further operable to:
   receive the indication of the one or more second parameters from the device; and
   perform an access operation with the one or more memory devices based at least in part on the one or more second parameters.

6. The memory system of claim 4, wherein the one or more host devices are further operable to:
   receive the indication of the one or more second parameters from the device; and
   transmit the indication of the one or more second parameters to the one or more memory devices based at least in part on receiving the indication of the one or more second parameters.

7. The memory system of claim 4, wherein the one or more second parameters comprise a trip point, a sense level, a voltage level, a time period, or any combination thereof.

8. The memory system of claim 4, wherein the one or more second parameters are based at least in part on an identity of the one or more memory devices.

9. The memory system of claim 1, wherein the one or more host devices are further operable to:
   determine one or more second parameters associated with operation of the one or more memory devices based at least in part on the indication of the one or more parameters indicative of the status of the one or more memory devices; and
   perform an access operation with the one or more memory devices based at least in part on the one or more second parameters.

10. The memory system of claim 1, wherein the one or more controllers of the one or more memory devices are further operable to:

determine one or more second parameters associated with operation of the one or more memory devices based at least in part on determining the one or more parameters indicative of the status of the one or more memory devices; and perform an operation of the one or more memory devices based at least in part on the one or more second parameters.

11. The memory system of claim 1, wherein the one or more parameters are indicative of a lifetime of the one or more memory devices, a level of wear of the one or more memory devices, one or more operating conditions at the one or more memory devices, or any combination thereof.

12. The memory system of claim 1, wherein the one or more host devices are further operable to:
transmit, to the device, an indication of an identity of the one or more memory devices in association with the one or more parameters.

13. A method, comprising:
receiving, at one or more host devices from one or more memory devices, an indication of one or more parameters indicative of a status of the one or more memory devices;
selecting a destination from a plurality of devices external to the one or more memory devices and external to the one or more host devices, the destination for communicating the one or more parameters based at least in part on receiving the indication of the one or more parameters; and
transmitting the one or more parameters to a device of the plurality of devices based at least in part on receiving, from the one or more memory devices, the indication of the one or more parameters and selecting the destination from the plurality of devices external to the one or more memory devices and for communicating the one or more parameters, the plurality of devices being different than the one or more host devices.

14. The method of claim 13, further comprising:
storing the indication of the one or more parameters in non-volatile memory associated with the one or more host devices based at least in part on receiving the indication of the one or more parameters, wherein transmitting the one or more parameters to the device is based at least in part on storing the indication of the one or more parameters.

15. The method of claim 13, further comprising:
converting the indication of the one or more parameters to data indicative of the one or more parameters, wherein transmitting the one or more parameters to the device is based at least in part on converting the indication of the one or more parameters.

16. The method of claim 13, further comprising:
identifying a trigger for transmitting the one or more parameters to the device, wherein transmitting the one or more parameters is based at least in part on identifying the trigger.

17. The method of claim 16, wherein the trigger comprises a time, a location of the one or more host devices or of the device, a distance to the device, a power state of the one or more host devices, reception of a message from the device, or any combination thereof.

18. The method of claim 13, further comprising:
determining one or more second parameters associated with operation of the one or more memory devices based at least in part on the indication of the one or more parameters indicative of the status of the one or more memory devices; and
performing an access operation with the one or more memory devices based at least in part on the one or more second parameters.

19. The method of claim 13, further comprising:
receiving, from the device, one or more second parameters associated with operation of the one or more memory devices based at least in part on transmitting the one or more parameters indicative of the status of the one or more memory devices; and
performing an access operation with the one or more memory devices based at least in part on the one or more second parameters.

20. The method of claim 13, further comprising:
receiving, from the device, one or more second parameters associated with operation of the one or more memory devices based at least in part on transmitting the one or more parameters indicative of the status of the one or more memory devices; and
transmitting an indication of the one or more second parameters to the one or more memory devices based at least in part on receiving the one or more second parameters.

21. The method of claim 13, wherein selecting the destination comprises:
selecting the device as the destination based at least in part on the device being associated with an entity of an ecosystem that includes the one or more host devices and the device, the entity associated with the one or more parameters.

22. The method of claim 13, wherein selecting the destination comprises:
selecting the device as the destination based at least in part on a category of memory device usage associated with the one or more parameters, the category corresponding to the device.

23. The method of claim 13, wherein receiving the indication of the one or more parameters comprises:
accessing a register of the one or more memory devices, wherein the register includes the indication of the one or more parameters.

24. The method of claim 13, wherein transmitting the one or more parameters comprises:
transmitting the one or more parameters to the device via a wired connection or a wireless connection.

25. The method of claim 13, wherein the one or more parameters are indicative of a lifetime of the one or more memory devices, a level of wear of the one or more memory devices, one or more operating conditions at the one or more memory devices, or any combination thereof.

26. A memory system, comprising:
one or more memory devices; and
one or more controllers coupled with the one or more memory devices and configured to cause the memory system to:
receive, at one or more host devices from the one or more memory devices, an indication of one or more parameters indicative of a status of the one or more memory devices;
select a destination from a plurality of devices external to the one or more memory devices and external to the one or more host devices, the destination for communicating the one or more parameters based at least in part on receiving the indication of the one or more parameters; and
transmit the one or more parameters to a device of the plurality of devices based at least in part on receiving, from the one or more memory devices, the indication of the one or more parameters and selecting the destination from the plurality of devices external to the one or more memory devices and for communicating the one or more parameters, the plurality of devices being different than the one or more host devices.

* * * * *